United States Patent
Kim et al.

(10) Patent No.: US 9,058,514 B2
(45) Date of Patent: Jun. 16, 2015

(54) APPARATUS AND METHOD FOR ESTIMATING JOINT STRUCTURE OF HUMAN BODY

(71) Applicant: Electronics and Telecommunications Research Institute, Daejeon (KR)

(72) Inventors: Ho-Won Kim, Seoul (KR); Seung-Wook Lee, Daejeon (KR); Ji-Hyung Lee, Daejeon (KR); Bon-Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 167 days.

(21) Appl. No.: 13/753,378

(22) Filed: Jan. 29, 2013

(65) Prior Publication Data
US 2013/0195330 A1    Aug. 1, 2013

(30) Foreign Application Priority Data

Jan. 31, 2012  (KR) .................. 10-2012-0009783

(51) Int. Cl.
*G06K 9/00*    (2006.01)

(52) U.S. Cl.
CPC ......... *G06K 9/00362* (2013.01); *G06T 2200/04* (2013.01); *G06T 2207/20044* (2013.01); *G06T 2207/30196* (2013.01); *G06K 9/00201* (2013.01)

(58) Field of Classification Search
None
See application file for complete search history.

(56) References Cited

U.S. PATENT DOCUMENTS

| | | | |
|---|---|---|---|
| 2008/0031512 A1 | 2/2008 | Mundermann et al. | |
| 2009/0154794 A1* | 6/2009 | Kim et al. | 382/154 |
| 2009/0232353 A1* | 9/2009 | Sundaresan et al. | 382/103 |
| 2011/0148875 A1* | 6/2011 | Kim et al. | 345/420 |
| 2011/0210915 A1* | 9/2011 | Shotton et al. | 345/157 |
| 2011/0234589 A1* | 9/2011 | Lee et al. | 345/424 |

OTHER PUBLICATIONS

Pin-Chou Liu et al., "Automatic Animation Skeleton Construction Using Repulsive Force Field," IEEE Trans. Proceedings of the 11th Pacific Conference on Computer Graphics and Applications, 2003.
Jamie Shotton et al., "Real-Time Human Pose Recognition in Parts from Single Depth Images," IEEE Computer Vision and Pattern Recognition, 2011.

* cited by examiner

*Primary Examiner* — Jon Chang

(57) ABSTRACT

Disclosed herein is an apparatus and method for estimating the joint structure of a human body. The apparatus includes a multi-view image acquisition unit for receiving multi-view images acquired by capturing a human body. A human body foreground separation unit extracts a foreground region corresponding to the human body from the acquired multi-view images. A human body shape restoration unit restores voxels indicating geometric space occupation information of the human body using the foreground region corresponding to the human body, thus generating voxel-based three-dimensional (3D) shape information of the human body. A skeleton information extraction unit generates 3D skeleton information from the generated voxel-based 3D shape information of the human body. A skeletal structure estimation unit estimates positions of respective joints from a skeletal structure of the human body using both the generated 3D skeleton information and anthropometric information.

15 Claims, 14 Drawing Sheets

APPARATUS AND METHOD FOR ESTIMATING JOINT STRUCTURE OF HUMAN BODY

CROSS REFERENCE TO RELATED APPLICATION

This application claims the benefit of Korean Patent Application No. 10-2012-0009783, filed on Jan. 31, 2012, which is hereby incorporated by reference in its entirety into this application.

BACKGROUND OF THE INVENTION

1. Technical Field

The present invention relates generally to an apparatus and method for estimating the joint structure of a human body. More particularly, the present invention relates to an apparatus and method for estimating the joint structure of a human body, which can estimate the skeletal structure of a relevant human body having assumed any posture in a specific space by using multi-view images that have been acquired by multiple cameras arranged around the human body.

2. Description of the Related Art

Technology for modeling the skeletal structure of an entity based on a skeletal system is used to estimate the joint positions, skeletal structures, posture information, etc. of an actual skeletal system from information about the deformation of the surface shape of the entity depending on the motions of joints.

In relation to this, conventional technologies include a paper published by Pin-Chou Liu, Fu-Che Wu, Wan-Chun Ma, Rung-Huei Liang, and Ming Ouhyoung and entitled "Automatic Animation Skeleton Construction Using Repulsive Force Field (hereinafter referred to as "Pin-Chou Liu")" (IEEE Trans. Proceedings of the 11th Pacific Conference on Computer Graphics and Applications, October 2003, pp. 409-413), and a paper published by Lawson Wade and Richard E. Parent and entitled "Automated Generation of Control Skeletons for Use in Animation" (The Visual Computer, vol. 18, no. 2, March 2002, pp. 97-110). These technologies disclose a scheme which, in order to realize a three-dimensional (3D) animation of an entity in the field of computer graphics, estimates a 3D skeletal structure suitable for the shape of the entity by extracting a 3D skeleton from a 3D polygon model obtained by modeling the surface shape of the entity, and binds the estimated skeletal structure to individual vertexes constituting the polygon, so that the surface shape of the entity is controlled via the control of joints.

Further, in the field of computer vision, in order to recognize an action using the motion capture of an entity, information about the deformation of the 3D shape based on the motion of the entity is acquired by various camera sensors, the 3D shape information of the entity is estimated from the acquired image information, and the positions and postures of individual joints in a skeletal structure are estimated based on the predefined skeletal structure of the entity from the estimated entity 3D shape information, so that the action of the entity is analyzed.

The above two types are similar to each other in that both estimate the skeletal structure of an entity, but are different from each other in the configuration of defining shape information used to estimate a skeletal structure or the characteristics of the skeletal structure.

The estimation of a skeletal structure in a polygon model which is mainly used in the field of graphics is implemented on the assumption that the ideal 3D surface shape information of an entity was input. In contrast, the estimation of a skeletal structure in the field of computer vision obtains surface shape information from image information about an actual entity obtained using an image sensor, so that there is always the possibility that the surface shape information of the actual entity will be distorted. As a result, a problem arises in that when an approach used to estimate a skeletal structure in the field of graphics is applied without being changed to the field of computer vision, it is difficult to accurately estimate a skeletal structure.

In regard to this information distortion, in order to not only ensure robustness of the estimation of the skeletal structure of an entity, but also recognize an action via the estimation of the postures of joints in the skeletal structure, most technologies in the field of computer vision use a method of predefining the 3D shape information and skeletal structure of an entity whose skeletal structure is to be estimated and controlling the postures of respective joints of the predefined skeletal structure, so that posture control values for the joints are detected to minimize a difference between the shape deformation information of the shape information model that has been simulated and predefined and shape information that has been obtained from input image information, thereby estimating the skeletal structure of the entity. In this case, as the predefined shape information, the shape information of the entity which has been obtained from the 3D scanning or image information of the entity and which is distorted has been used in most cases. For the skeletal structure, a skeletal structure model including information about the positions or lengths of joints predefined by a user in accordance with the actual skeleton of the entity has been used.

Further, approaches in the field of such computer vision have mainly used tracking methods dependent on the joint information of temporally adjacent image frames to estimate the positions of joints in the skeletal structure, that is, to capture motions. However, these methods are problematic in that errors are propagated when tracking is erroneously performed on adjacent image frames.

In order to solve the above problems, a paper published by Jamie Shotton, et al. and entitled "Real-Time Human Pose Recognition in Parts from Single Depth Images" (presented at IEEE Computer Vision and Pattern Recognition 2011, June 2011) proposes a method of independently estimating the postures of joints for respective image frames by using data-based training.

SUMMARY OF THE INVENTION

Accordingly, the present invention has been made keeping in mind the above problems occurring in the prior art, and an object of the present invention is to provide technology that extracts the skeleton information of a human body having assumed any posture using multi-view image information obtained by capturing the human body from various angles based on anthropometric information, without having to perform data-based training, binds the extracted skeleton information of the human body to the anthropometric information, and estimates the posture information of individual joints constituting the skeletal structure of the human body, thereby estimating the skeletal structure of the human body which has assumed any posture.

In accordance with an aspect of the present invention to accomplish the above object, there is provided an apparatus for estimating a joint structure of a human body, including a multi-view image acquisition unit for receiving multi-view images acquired by capturing a human body; a human body foreground separation unit for extracting a foreground region corresponding to the human body from the acquired multi-view images; a human body shape restoration unit for restoring voxels indicating geometric space occupation information of the human body using the foreground region corresponding to the human body, thus generating voxel-based three-dimensional (3D) shape information of the human body; a skeleton information extraction unit for generating 3D skeleton information from the generated voxel-based 3D shape information of the human body; and a skeletal structure estimation unit for estimating positions of respective joints from a skeletal structure of the human body using both the generated 3D skeleton information and anthropometric information.

Preferably, the skeleton information extraction unit may include a medial surface voxel extraction unit for extracting medial surface voxels, which are a minimum number of surface voxels enabling representation of a 3D shape of the human body, from surface voxels in the 3D shape information of the human body.

Preferably, the skeleton information extraction unit may further include a weight calculation unit for calculating weights indicative of distances from a center of gravity of the human body to the respective extracted medial surface voxels.

Preferably, the skeleton information extraction unit may further include a node estimation unit for extracting nodes, which are medial surface voxels corresponding to local minima, from the medial surface voxels based on the weights.

Preferably, the skeleton information extraction unit may further include a root node determination unit for determining a root node corresponding to a root joint in a hierarchical skeletal structure of the human body from the nodes.

Preferably, the skeleton information extraction unit may further include a 3D skeletal structure extraction unit for connecting the nodes along a shortest path based on Dijkstra's algorithm by using the root node as a starting point, and then extracting information about 3D skeletons for respective regions of the human body.

Preferably, the multi-view image acquisition unit may perform camera geometric calibration on each of the multi-view images, input from multiple cameras that capture the human body, based on a global coordinate system located at a center of gravity of the multiple cameras.

Preferably, the human body shape restoration unit may project individual voxels in a voxel space, which is constructed based on information about the camera geometric calibration performed by the multi-view image acquisition unit, on each of the multi-view images, thus generating the voxel-based 3D shape information of the human body.

Preferably, the apparatus may further include a storage unit for storing the information about the camera geometric calibration, the anthropometric information, and information about the hierarchical skeletal structure of the human body.

In accordance with another aspect of the present invention to accomplish the above object, there is provided a method of estimating a joint structure of a human body, including receiving multi-view images acquired by capturing a human body; extracting a foreground region corresponding to the human body from the acquired multi-view images; restoring voxels indicating geometric space occupation information of the human body using the foreground region corresponding to the human body, thus generating voxel-based three-dimensional (3D) shape information of the human body; generating 3D skeleton information from the generated voxel-based 3D shape information of the human body; and estimating positions of respective joints from a skeletal structure of the human body using both the generated 3D skeleton information and anthropometric information.

Preferably, the generating the 3D skeleton information may include extracting medial surface voxels, which are a minimum number of surface voxels enabling representation of a 3D shape of the human body, from surface voxels in the 3D shape information of the human body.

Preferably, the generating the 3D skeleton information may further include calculating weights indicative of distances from a center of gravity of the human body to the respective medial surface voxels.

Preferably, the generating the 3D skeleton information may further include extracting nodes, which are medial surface voxels corresponding to local minima, from the medial surface voxels based on the weights.

Preferably, the generating the 3D skeleton information may further include determining a root node corresponding to a root joint in a hierarchical skeletal structure of the human body from the nodes.

Preferably, the generating the 3D skeleton information may further include connecting the nodes along a shortest path based on Dijkstra's algorithm by using the root node as a starting point, and then extracting information about 3D skeletons for respective regions of the human body.

Preferably, the receiving the multi-view images acquired by capturing the human body may include performing camera geometric calibration on each of the multi-view images, input from multiple cameras that capture the human body, based on a global coordinate system located at a center of gravity of the multiple cameras.

Preferably, the voxel-based 3D shape information of the human body may be generated by projecting individual voxels in a voxel space, which is constructed based on information about the camera geometric calibration, on each of the multi-view images.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
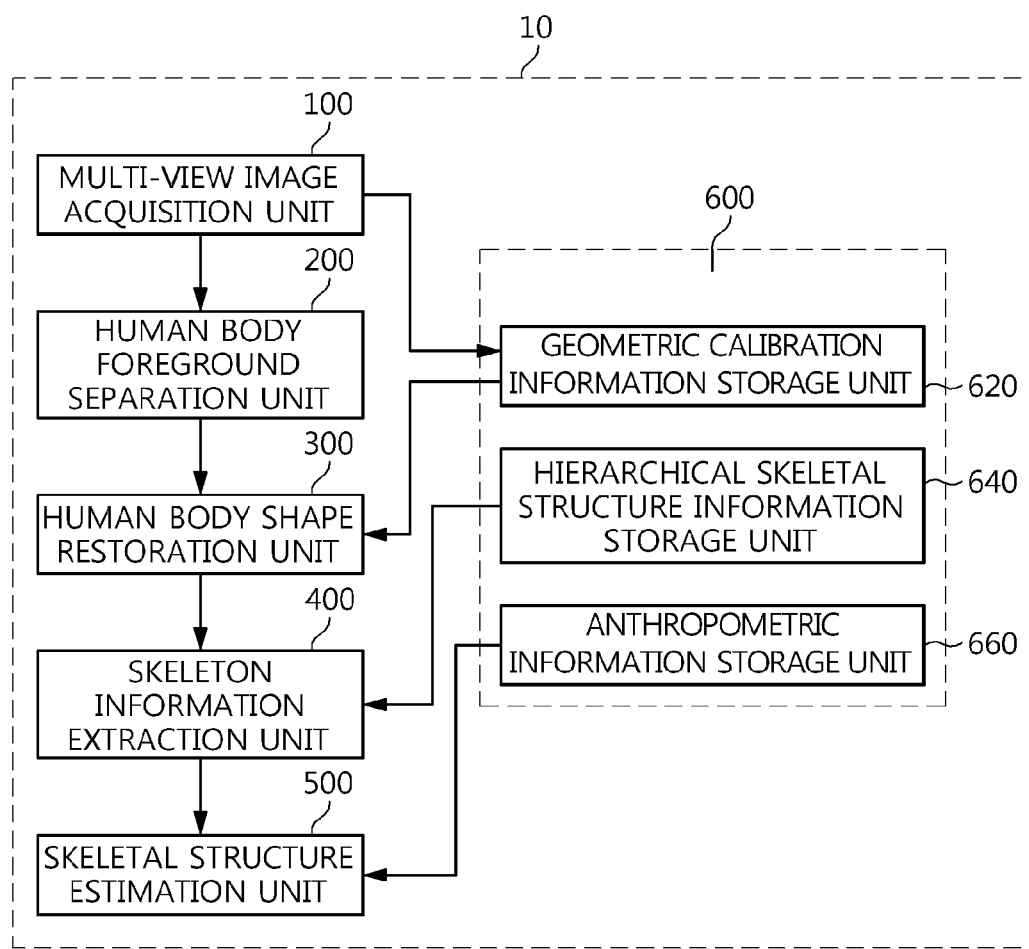
FIG. 1 is a block diagram showing the configuration of an apparatus for estimating the joint structure of a human body according to the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, the configuration and operation of an apparatus for estimating the joint structure of a human body according to the present invention will be described in detail with reference to FIGS. 1 to 12.

FIG. 1 is a block diagram showing the configuration of an apparatus for estimating the joint structure of a human body according to the present invention.

Referring to FIG. 1, an apparatus 10 for estimating the joint structure of a human body according to the present invention includes a multi-view image acquisition unit 100, a human body foreground separation unit 200, a human body shape restoration unit 300, a skeleton information extraction unit 400, a skeletal structure estimation unit 500, and a storage unit 600.

Figure 2:
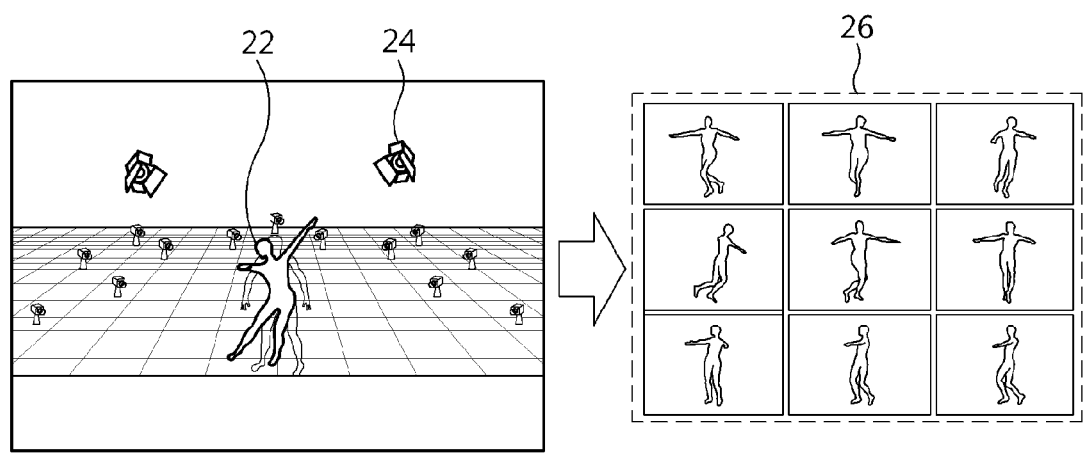
FIG. 2 is a diagram showing the acquisition of multi-view images from multiple cameras which capture a human body which has assumed any posture.
Figure 3:
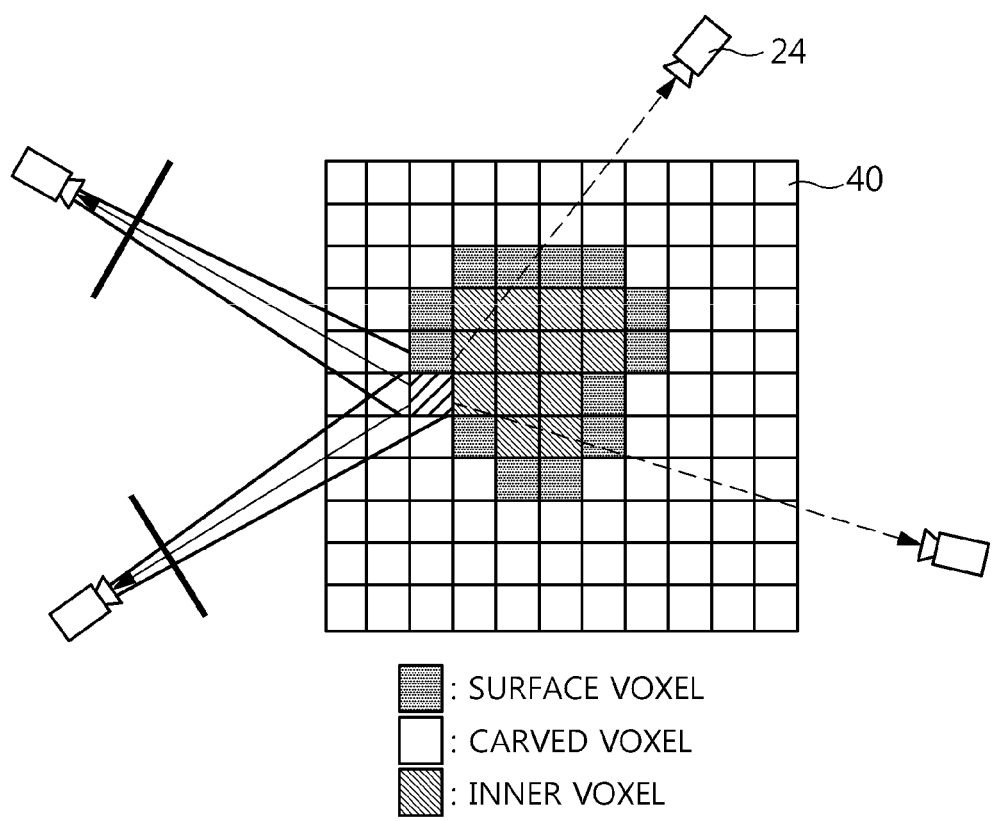
FIG. 3 is a diagram showing the generation of 3D shape information of a human body based on voxels.

Referring to FIG. 1 together with FIG. 2, the multi-view image acquisition unit 100 receives multi-view images 26 as input from multiple cameras 24 which captured a human body 22 having assumed any posture in a specific space. Further, the multi-view image acquisition unit 110 performs camera geometric calibration on each of the received multi-view images 26 on the basis of a global coordinate system located at the center of gravity of the multiple cameras. Furthermore, the multi-view image acquisition unit 110 stores information about camera geometric calibration performed on each of the multi-view images 26 in the geometric calibration information storage unit 620 of the storage unit 600.

The human body foreground separation unit 200 extracts a foreground region, corresponding to an area obtained by capturing the human body, from each of the multi-view images 26 on which camera geometric calibration has been performed by the multi-view image acquisition unit 100. That is, the human body foreground separation unit 200 extracts the foreground region from each of the multi-view images 26 on which camera geometric calibration has been performed by the multi-view image acquisition unit 100 using a chroma-key method in which differences between a background image, that is, an image captured at the location of each corresponding camera in the absence of a human body, and an image captured in the presence of a human body are used.

The human body shape restoration unit 300 restores voxels indicative of geometric space occupation information of the human body from the foreground region corresponding to the human body extracted by the human body foreground separation unit 200, thus generating voxel-based 3D shape information of the human body. Referring to the above drawings together with FIG. 3, the human body shape restoration unit 300 constructs the space of a 3D image including the human body using combinations of voxels 40 having a specific size based on the camera geometric calibration information previously stored in the geometric calibration information storage unit 620 of the storage unit 600. Further, the human body shape restoration unit 300 projects individual voxels 40 of a voxel space constructed based on the camera geometric calibration information on each individual image, and determines whether each voxel is present depending on whether a region of each image on which the individual voxels 40 have been projected is included in the foreground region corresponding to the human body extracted by the human body foreground separation unit 200. Voxels existing as a result of the above restoration procedure denote 3D shape information of the human body which is the geometric space occupation information of the human body in the 3D space when the human body is actually located in the 3D space and has assumed a posture. That is, the shape of the human body that occupies a certain portion in the 3D space is included in the universal set of the existing voxels.

The skeleton information extraction unit 400 extracts a minimum number of surface voxels enabling the representation of the 3D shape of the human body from the surface voxels in the voxel-based 3D shape information of the human body generated by the human body shape restoration unit 300. Further, the skeleton information extraction unit 400 estimates nodes which are surface voxels corresponding to local minima by using direction information facing the center of gravity of the extracted medial surface voxels, and determines a root node corresponding to the root joint of the hierarchical skeletal structure of the human body from the nodes, thus generating information about the 3D skeleton of the human body.

Figure 4:
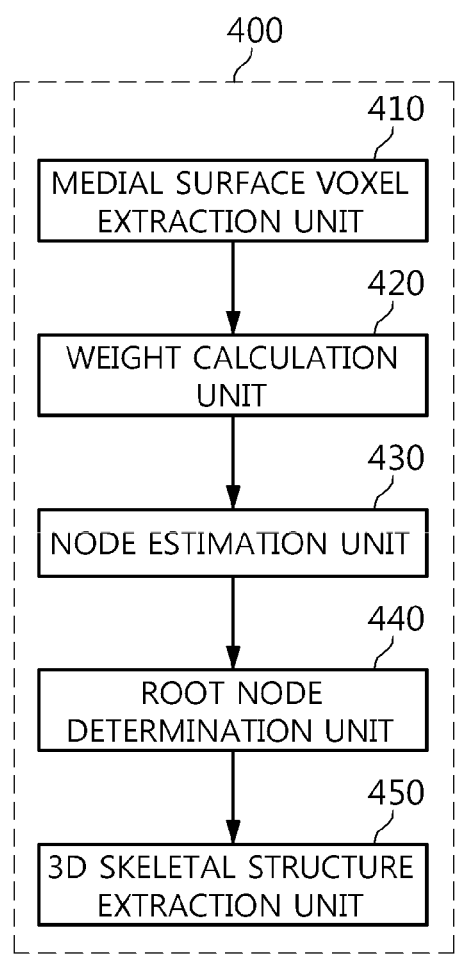
FIG. 4 is a block diagram showing the configuration of the skeleton information extraction unit of FIG. 1.
Figure 5:
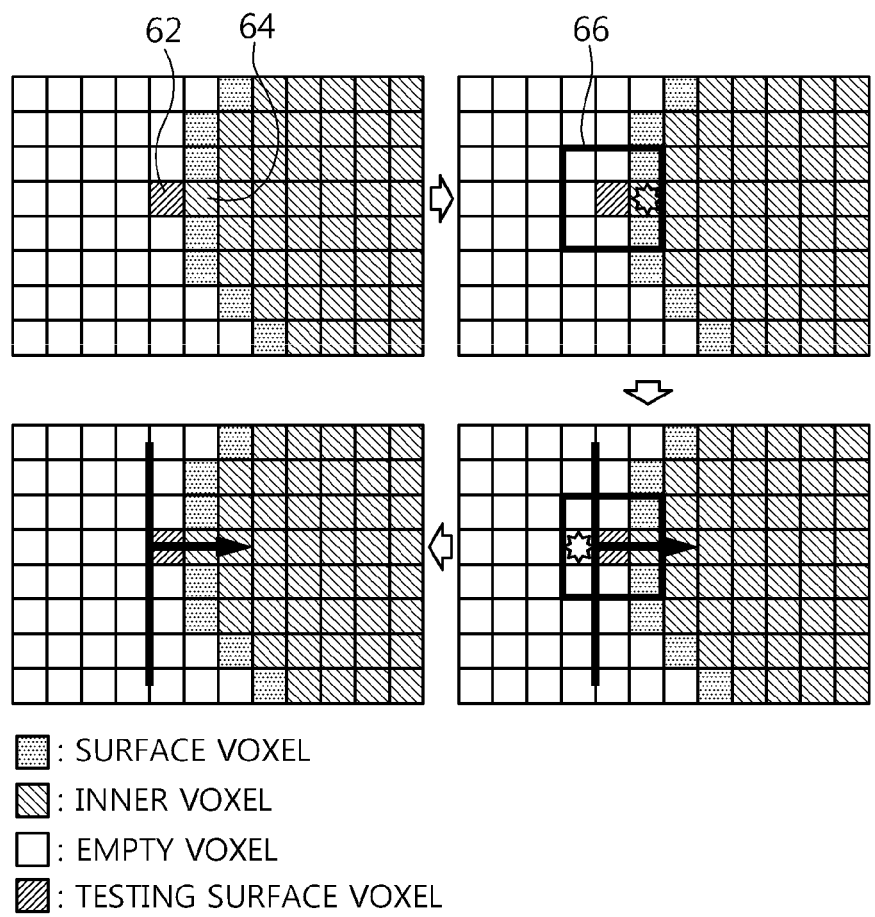
FIG. 5 is a diagram showing the extraction of medial surface voxels.

Referring to FIG. 4, the skeleton information extraction unit 400 may include in detail a medial surface voxel extraction unit 410, a weight calculation unit 420, a node estimation unit 430, a root node determination unit 440, and a 3D skeletal structure extraction unit 450.

Figure 6:
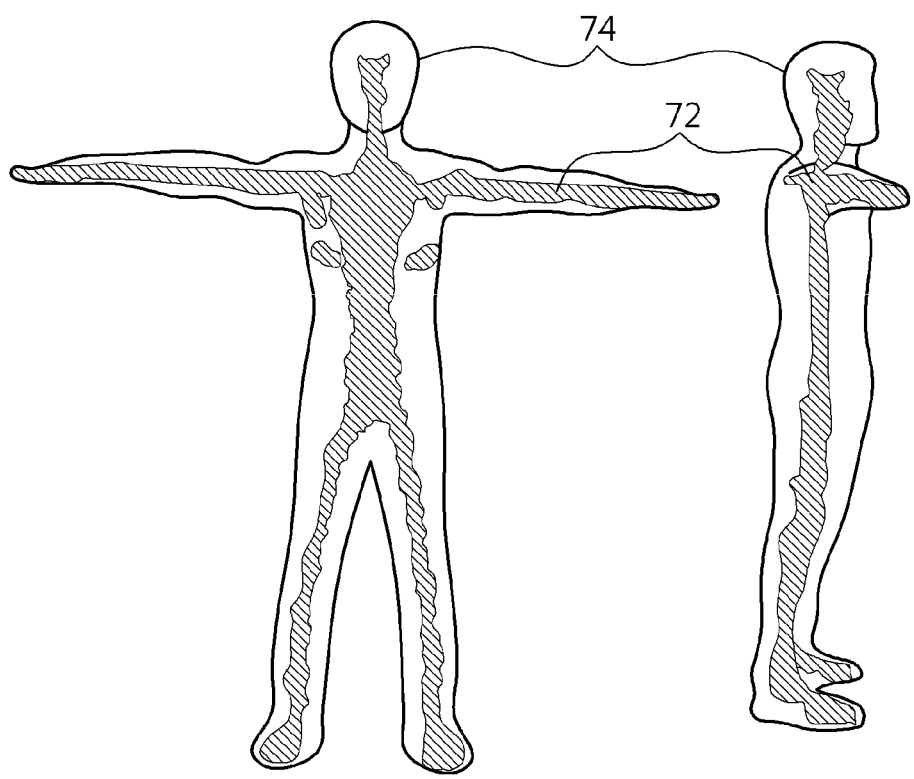
FIG. 6 is a diagram showing the comparison of the number of surface voxels with the number of medial surface voxels.
Figure 7:
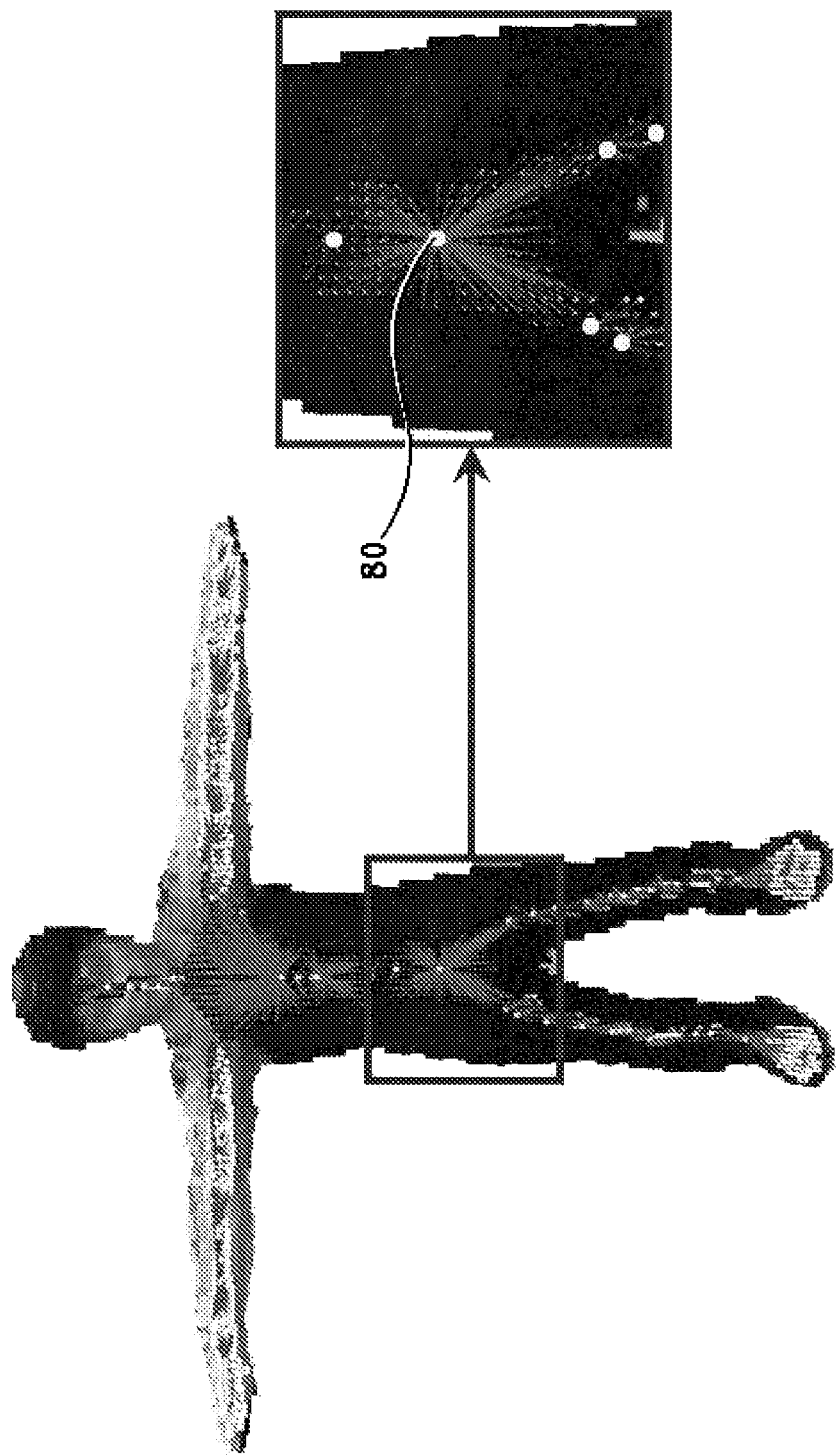
FIG. 7 is a diagram showing the estimation of nodes corresponding to local minima.

The medial surface voxel extraction unit 410 is configured to, if the 3D shape information of the human body having assumed any posture is generated using the restoration of voxels by the human body shape restoration unit 300, remove surface voxels until only a minimum number of voxels enabling the representation of the 3D shape of the corresponding human body remain so as to extract skeleton information from surface voxels of the restored voxels, thereby extracting a number of medial surface voxels that are a minimum number of surface voxels enabling the 3D shape of the human body to be represented. First, referring to the above drawings together with FIG. 5, the medial surface voxel extraction unit 410 estimates direction vectors of inner voxels 64 from adjacent voxels that neighbor one another in the 3D space around a testing surface voxel 62, and configures a 3D surface 66 using the estimated direction vectors of the adjacent inner voxels. Further, the medial surface voxel extraction unit 410 determines whether a relevant surface voxel falling within the range of a certain angle with respect to the direction vector of the 3D surface 66 is present in a space under the 3D surface 66. If it is determined that any surface voxel is not present in the space under the 3D surface, the corresponding testing surface voxel is eliminated because it is not a medial surface voxel. In contrast, if it is determined that the surface voxel is present in the space under the configured 3D surface, the testing surface voxel is a voxel for connecting the medial surface, so that it is extracted as a medial surface voxel. As a result of the extraction of the medial surface voxels, the number of medial surface voxels 72 is reduced at a higher rate compared to the number of surface voxels 74 of the 3D surface information of the human body generated by the human body shape restoration unit 300, as illustrated in FIG. 6. Further, the medial surface voxels 72 are still distributed in the 3D space.

The weight calculation unit 420 calculates weights indicative of distances from the center of gravity of the human body to the respective medial surface voxels extracted by the medial surface voxel extraction unit 410. That is, in order to extract one dimensional (1D) skeleton information from the medial surface voxels extracted by the medial surface voxel extraction unit 410, an additional data processing procedure must be performed. For this operation, the weight calculation unit 420 calculates weights indicative of the distances from the center of gravity of the human body to respective medial surface voxels, extracted by the medial surface voxel extraction unit 410, relative to the adjacent surface voxels. An algorithm for calculating weights relative to the surface voxels is well known by the algorithm for obtaining a repulsive force disclosed in the above-described paper published by Pin-Chou Liu, Fu-Che Wu, Wan-Chun Ma, and Ming Ouhyoung and entitled "Skeleton Extraction of 3D Objects with Visible Repulsive Force" (presented at Computer Graphics Workshop 2003 in Hua-Lien Taiwan, 2003). Accordingly, in the present specification, a detailed description of the algorithm for calculating weights relative to surface voxels is omitted. However, the present invention needs only to find surface voxels intersecting the direction of corresponding rays without having to construct an octree structure for accelerating the calculation of weights as in the case of 'Pin-Chou Liu' and 'Fu-Che Wu', and also needs to calculate only the weights of voxels corresponding to the medial surface without calculating the weights of all voxels in a sampling voxel space, thus realizing the advantage of shortening the time required to calculate weights. In this case, weights have a value closer to '1' in the case of medial surface voxels closer to the surface of the human body, and have a value closer to '0' in the case of medial surface voxels closer to the center of gravity of the human body. Further, weights have direction information facing the center of gravity of the human body.

Figure 8:
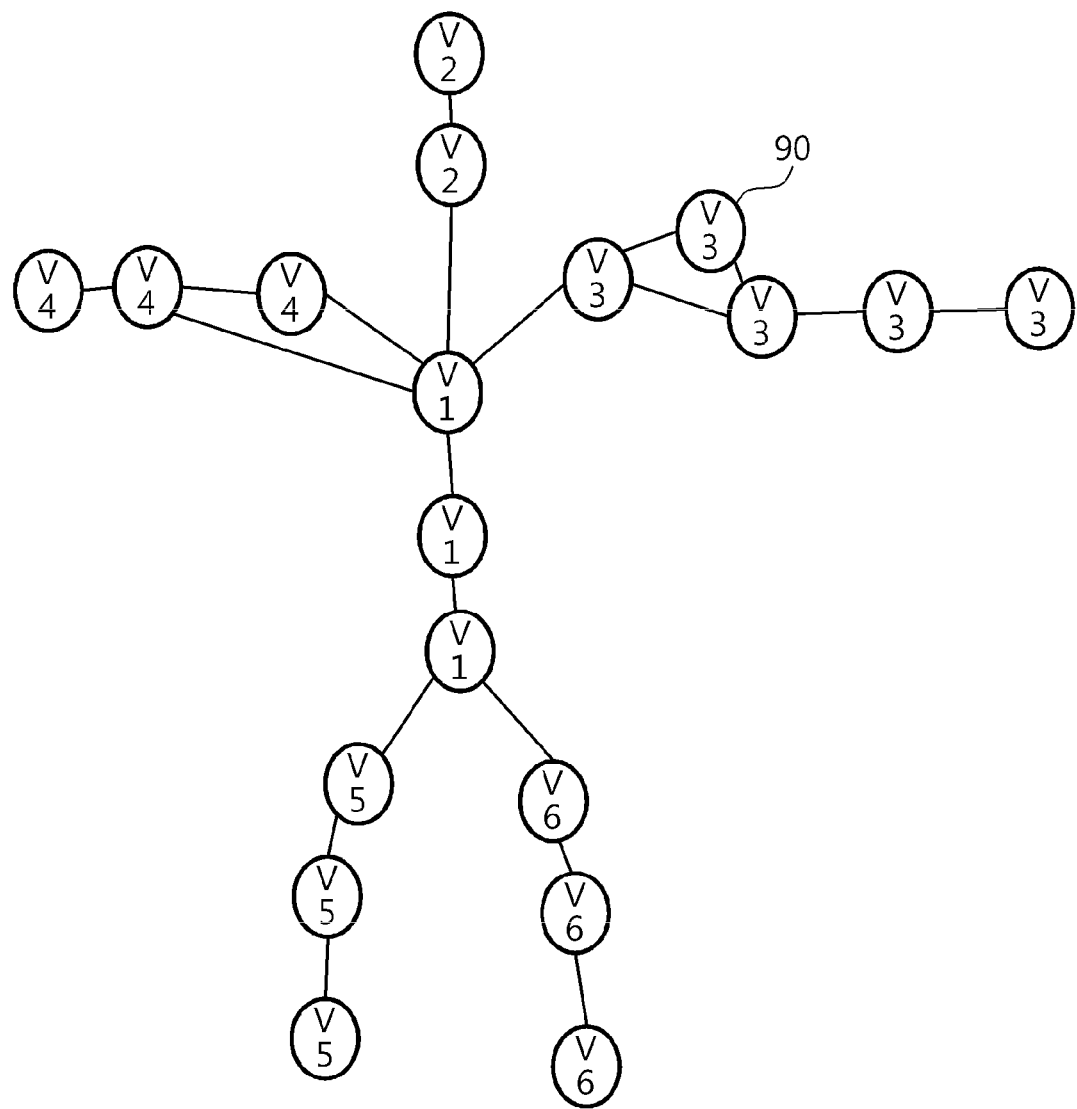
FIG. 8 is a diagram illustrating nodes.

Once the weights of medial surface voxels have been calculated by the weight calculation unit 420, the node estimation unit 430 estimates medial surface voxels corresponding to the local minima using the direction information of the individual medial surface voxels in order to extract the 3D skeleton information of the human body desired to be obtained from the medial surface based on the weights. In this case, the algorithm for estimating local minima in the present invention is implemented using the scheme for extracting local minima which is disclosed in the above-described paper 'Fu-Che Wu'. In the present specification, a detailed description of the algorithm for estimating local minima will be omitted. However, 'Fu-Che Wu' searches a continuous 3D space at vertexes constituting a mesh, but the present invention searches medial surface voxels for local minima based on the weights and direction information of adjacent medial surface voxels among the individual medial surface voxels. Further, referring to the above drawings together with FIG. 7, the present invention needs to search only medial surface voxels for local minima without searching all surface voxels in the entire voxel space for local minima. Therefore, there is an advantage in that the time required to search for local minima in the present invention is shorter than the time required by 'Fu-Che Wu' to search for local minima Hereinafter, medial surface voxels 80 corresponding to local minima are referred to as "nodes." Here, at the respective nodes, pieces of information indicating which medial surface voxels have converged on the nodes are stored. By using such information, individual nodes 90 can be represented by an illustrative diagram, as shown in FIG. 8. An edge cost between nodes can be represented by the product of the sum of weights of medial surface voxels present on a line for connecting two nodes and the Euclidean distance between the nodes.

Figure 9:
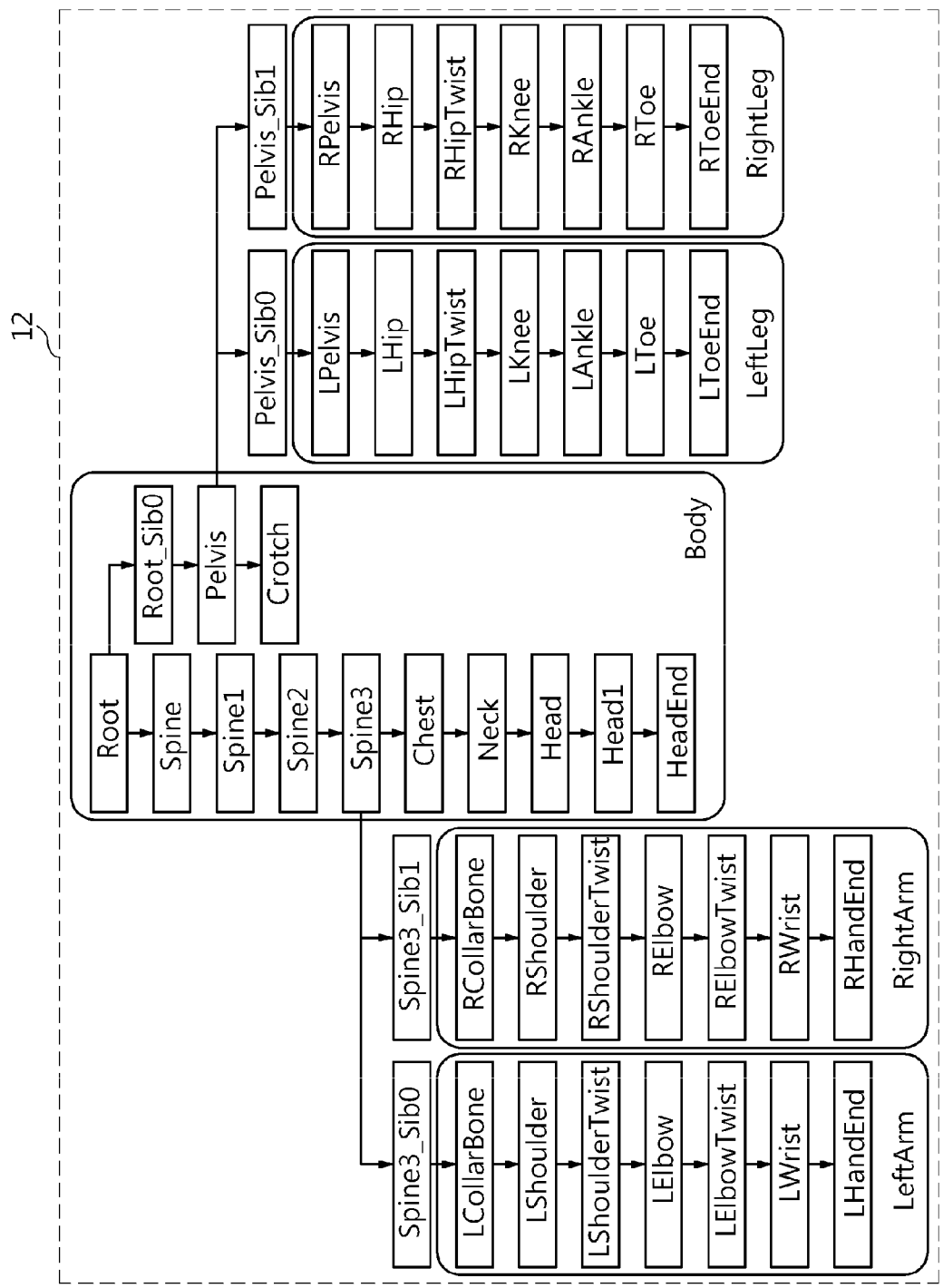
FIG. 9 is a diagram illustrating the hierarchical skeletal structure of a human body.

Once the diagram for the individual nodes has been constructed, the root node determination unit 440 determines the position of a joint that is a root in the hierarchical skeletal structure of the human body previously stored in the hierarchical skeletal structure information storage unit 640 of the storage unit 600. In this case, the hierarchical skeletal structure 12 of the human body previously stored in the hierarchical skeletal structure information storage unit 640 of the storage unit 600 can be modeled as a branched tree structure, as illustrated in FIG. 9. The root node determination unit 440 determines a node on which a largest number of voxels among the medial surface voxels converge to be a node corresponding to a joint that is a root (hereinafter referred to as a "root node"). Typically, the root node is typically determined near the pit of the stomach.

Figure 10:
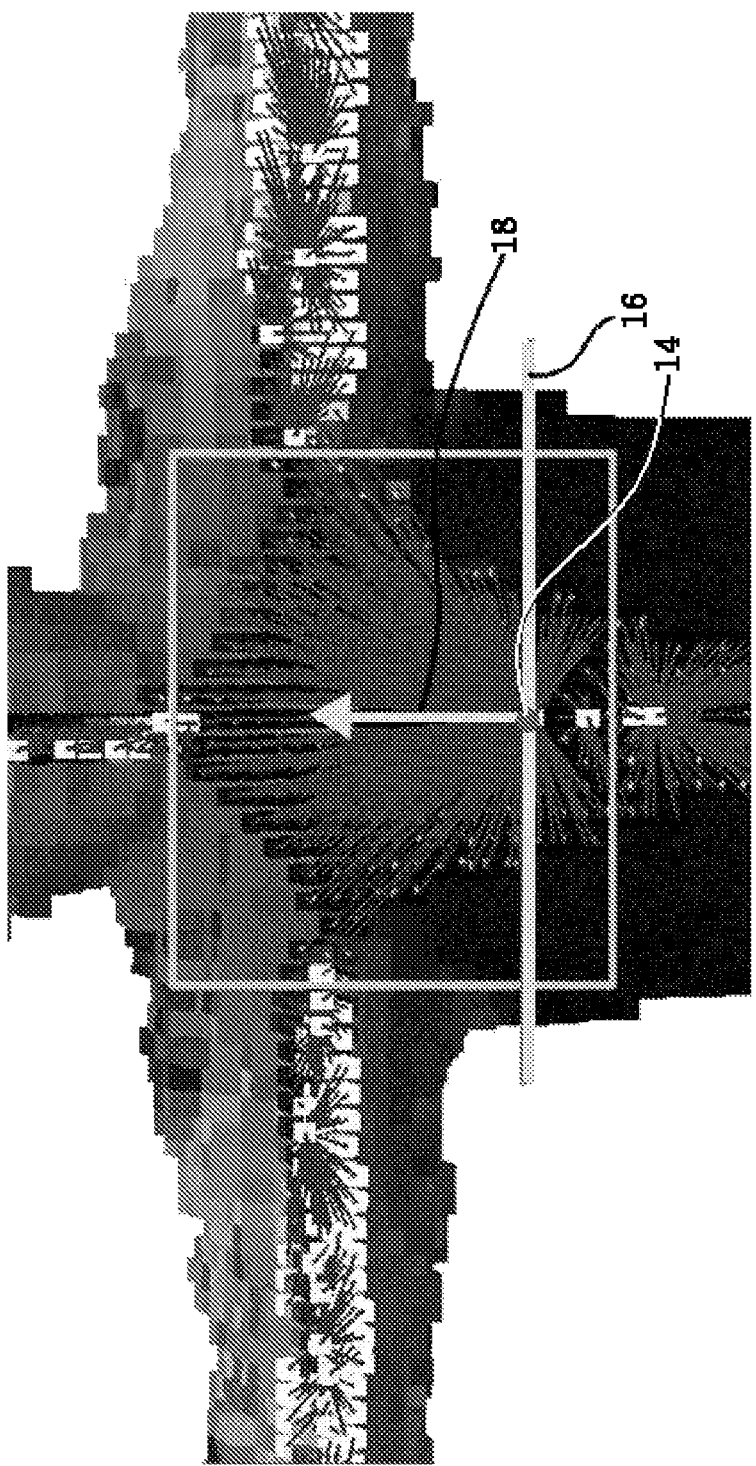
FIG. 10 is a diagram showing discrimination between an upper part and a lower part of a human body based on a root node.

Once the root node has been determined by the root node determination unit 440, the 3D skeletal structure extraction unit 450 connects the nodes along a shortest path based on Dijkstra's algorithm by using the root node as a starting point, generates information about 3D skeletons for respective regions of the human body, and then estimates information indicating to which regions of the actual human body the 3D skeletons correspond (hereinafter referred to as "region information"). For this, the 3D skeletal structure extraction unit 450 primarily estimates 3D surface information using medial surface voxels converging on a root node 14. Once the 3D surface has been defined, as illustrated in FIG. 10, the 3D skeletal structure extraction unit 450 separates medial surfaces of the upper part and the lower part of the human body on the basis of a line 16. A line that causes the difference between the upper part and the lower part to be maximized is detected, so that as indicated by an arrow 18, the upper part and the lower part of the human body are discriminated from each other. When the discrimination of the upper part and the lower part is performed, the 3D skeletal structure extraction unit 450 divides regions of a 3D space into regions corresponding to a head region, a trunk region, left/right arms, and left/right legs, around the root node 14 and estimates region information indicating to which regions of the human body the respective nodes correspond. The 3D skeletal structure extraction unit 450 finds the shortest path, which has the root node as a starting point and passes through nodes that have the smallest sum of weights, by applying Dijkstra's shortest path extraction algorithm to nodes of the respective regions of the human body in the diagram of the nodes, and connects the nodes of the shortest path for each region of the human body, thereby generating 3D skeleton information. Once the 3D skeleton information has been generated for each region of the human body, the 3D skeletal structure extraction unit 450 verifies whether the estimation of each region is suitable, based on the 3D Euclidean distance of each skeleton. After the verification has been completed, the 3D skeletal structure extraction unit 450 distinguishes left/right parts of arm and leg regions using the direction information of feet in the leg region and the direction information of the head region. In detail, in order to primarily distinguish left/right parts of leg regions, the turning angles of ankles are extracted from information about nodes located at the longest distance in the leg regions. Next, by using restriction information related to the turning angles of ankles indicating that ankles cannot be turned at an angle of 90 or more degrees in the state in which the facial region of the human body actually assumes a T-posture to look straight ahead, the left/right parts of leg regions are distinguished from each other. Through the above procedure, once the left/right parts of the leg regions have been distinguished from each other, left/right parts of arm regions can be automatically distinguished from each other. In this case, if region information is estimated to reverse left/right parts of arm and leg regions, left/right parts of arm and leg regions are changed.

Figure 11:
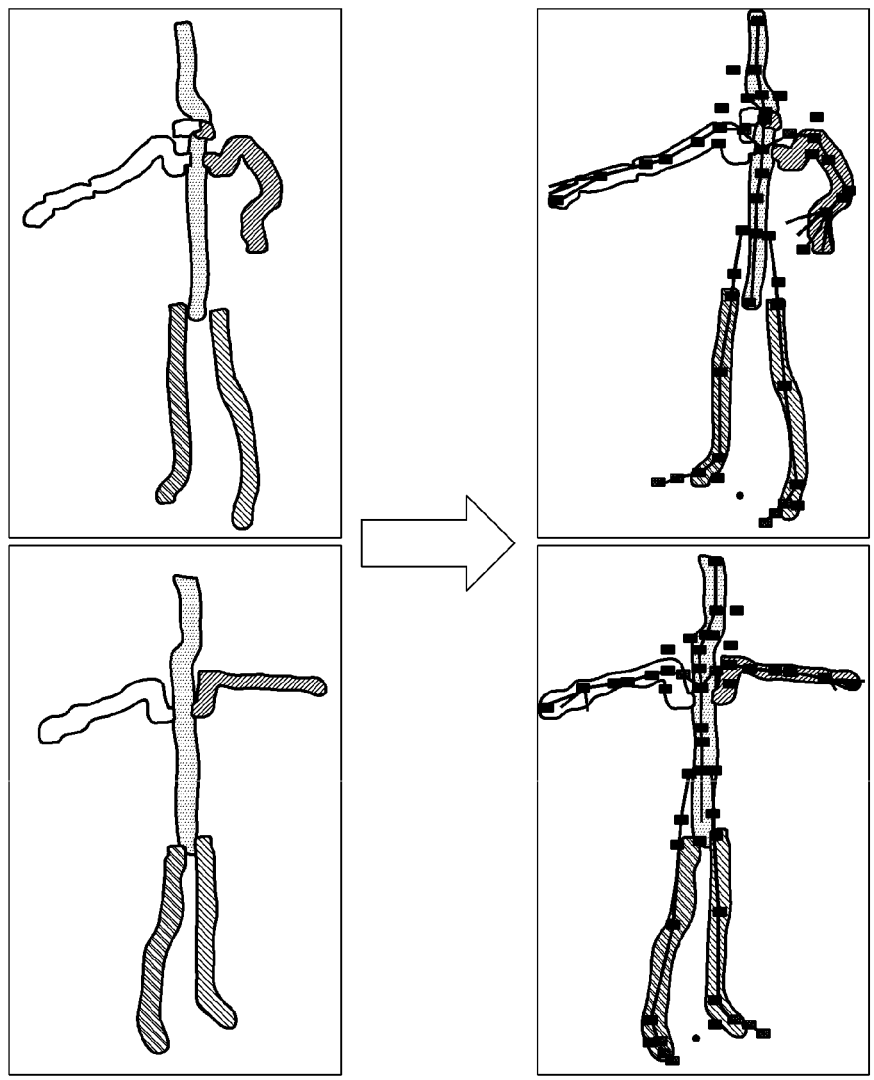
FIG. 11 is a diagram showing the application of the hierarchical skeletal structure to a human body.
Figure 12:
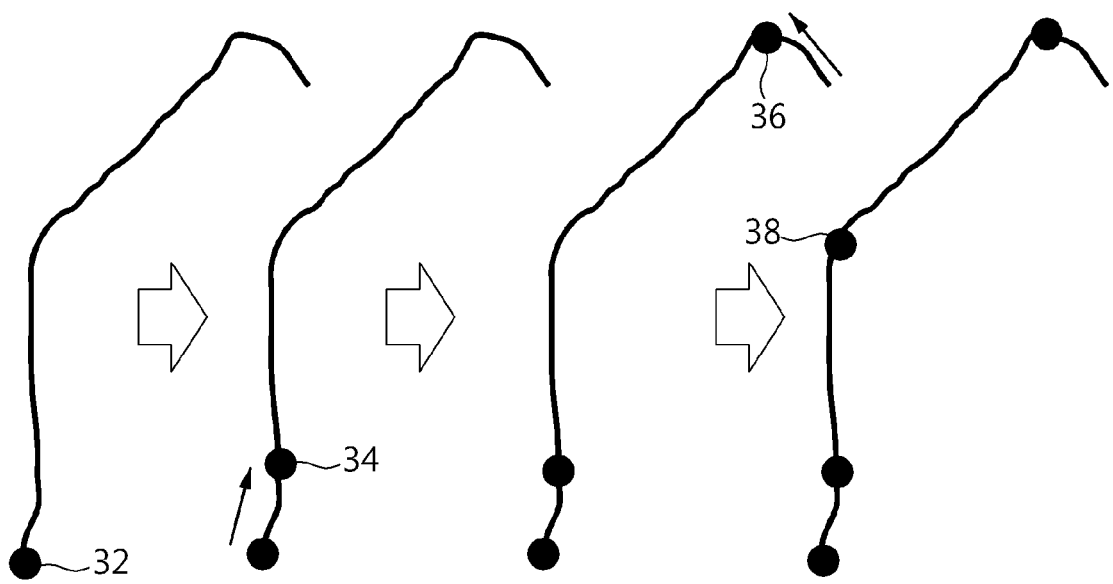
FIG. 12 is a diagram showing the estimation of the positions of joints using 3D skeleton information about a right arm.

The skeletal structure estimation unit 500 estimates the positions of respective joints from the skeletal structure of the human body using both 3D skeleton information of individual regions of the human body generated by the skeleton information extraction unit 400 and the anthropometric information. That is, the skeletal structure estimation unit 500 estimates the positions of respective joints using the 3D skeleton information generated for individual regions, and extracts the rotation angles of the respective joints using the position information about adjacent joints. Accordingly, as shown in FIG. 11, the hierarchical skeletal structure of the human body previously stored in the hierarchical skeletal structure information storage unit 640 of the storage unit 600 is applied to the corresponding human body. For this, the skeletal structure estimation unit 500 extracts the height information of the human body using the 3D skeleton information about the individual regions of the human body and the region information, which are generated by the skeleton information extraction unit 400. The reason for this is that the anthropometric information previously stored in the anthropometric information storage unit 660 of the storage unit 600 is classified based on the height information of each human body. Once the height of the human body has been designated, the anthropometric information provides average lengths for respective regions which indicate the average lengths of arms and legs, knees, etc. corresponding to the height of the human body. The pieces of information about the average lengths for respective regions obtained from the anthropometric information are applied to the 3D skeletons for respective regions of the human body generated by the skeleton information extraction unit 400, and are matched to pieces of curve information of the 3D skeletons for respective regions of the human body, and thus the positions of the joints of the actual human body can be estimated. For example, a procedure in which the skeletal structure estimation unit 500 estimates the positions of joints using the 3D skeleton information of a right arm will be described with reference to FIG. 12. First, the skeletal structure estimation unit 500 is provided with information about the hand lengths of human bodies and the margin of error based on Korean adults from the anthropometric information previously stored in the anthropometric information storage unit 660 of the storage unit 600. The skeletal structure estimation unit 500 estimates a position, having the shortest circumference around a region corresponding to the hand length of the human body from a lower tip 32 in the 3D skeleton of the right arm of the human body generated by the skeleton information extraction unit 400, to be the position 34 of a wrist joint, by using the information about the hand length of the human body (for example, 20 cm) and a margin of error (for example, within the range of +1-3 cm of the hand length) received from the anthropometric information. Further, the skeletal structure estimation unit 500 estimates a position, at which the circumference of a section around a region estimated to be a shoulder rapidly changes, to be the position 36 of a shoulder joint using the anthropometric information. Once the positions of the wrist and shoulder joints have been estimated, an elbow joint is the only portion where bending can occur between the shoulder and wrist joints of the arms of the human body, so that a position spaced apart from the position 34 of the wrist joint and the position 36 of the shoulder joint by the longest distance on a line connecting the positions 34 and 36 is estimated to be the position 38 of the elbow joint. In this way, the skeletal structure estimation unit 500 can primarily estimate the positions of joints, the positions of which can be definitely estimated or can be easily estimated due to the existence of the bending of a knee or an elbow for example, and can automatically estimate the positions of the remaining joints that have not yet been estimated by using the primarily estimated joint positions and the anthropometric information. Further, the skeletal structure estimation unit 500 estimates the overall skeletal structure of the human body which has assumed any posture by combining pieces of information about the estimated joint positions.

The storage unit 600 includes the geometric calibration information storage unit 620, the hierarchical skeletal structure information storage unit 640, and the anthropometric information storage unit 660.

The geometric calibration information storage unit 620 stores information about camera geometric calibration performed on each of the multi-view images 26 by the multi-view image acquisition unit 110, and provides the information to the human body shape restoration unit 300. Further, the hierarchical skeletal structure information storage unit 640 stores information about the hierarchical skeletal structure of the human body, and provides the information to the root node determination unit 440. In this case, the actual 3D positions of the nodes of each tree structure are generated using the user input based on a GUI or the analysis of anthropometry-based skeletal structures. Further, such a hierarchical skeletal structure of the human body can be freely defined by the user within the range of the skeletal system. Furthermore, the anthropometric information storage unit 660 stores anthropometric information and provides it to the skeletal structure estimation unit 500.

Hereinafter, a method of estimating the joint structure of a human body according to the present invention will be described in detail with reference to FIGS. 13 and 14. Description of repetitive portions similar to the operations of the apparatus for estimating the joint structure of the human body which have been described with reference to FIGS. 1 to 12 will be omitted.

Figure 13:
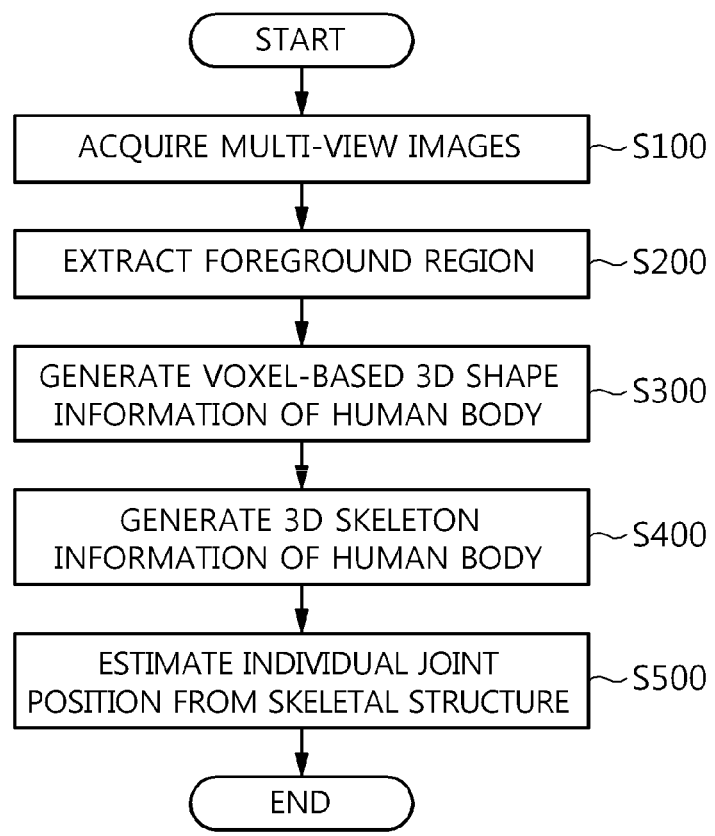
FIGS. 13 and 14 are flowcharts showing a method of estimating the joint structure of a human body according to the present invention.

FIG. 13 is a flowchart showing a method of estimating the joint structure of a human body according to the present invention.

Referring to FIG. 13, in the method of estimating the joint structure of the human body according to the present invention, the multi-view image acquisition unit receives multi-view images, acquired by capturing a human body which has assumed any posture in a specific space, as input from multiple cameras at step S100. In this case, the multi-view image acquisition unit performs camera geometric calibration on each of the multi-view images input from the multiple cameras which capture the human body, on the basis of a global coordinate system located at the center of gravity of the multiple cameras.

The human body foreground separation unit extracts a foreground region corresponding to an area obtained by capturing the human body from each of the multi-view images, on which camera geometric calibration has been performed by the multi-view image acquisition unit at step S200.

Next, the human body shape restoration unit restores voxels indicating geometric space occupation information of the human body from the foreground region corresponding to the human body extracted by the human body foreground separation unit, thus generating voxel-based 3D shape information of the human body at step S300. In this case, the voxel-based 3D shape information of the human body is generated by projecting individual voxels in a voxel space constructed based on the information about the camera geometric calibration on each of the multi-view images.

Further, the skeleton information extraction unit generates the 3D skeleton information of the human body from the voxel-based 3D shape information of the human body generated by the human body shape restoration unit at step S400.

Finally, the skeletal structure estimation unit estimates the positions of respective joints from the skeletal structure of the human body using the 3D skeleton information of the human body generated by the skeleton information extraction unit and the anthropometric information previously stored in the storage unit at step S500.

Figure 14:
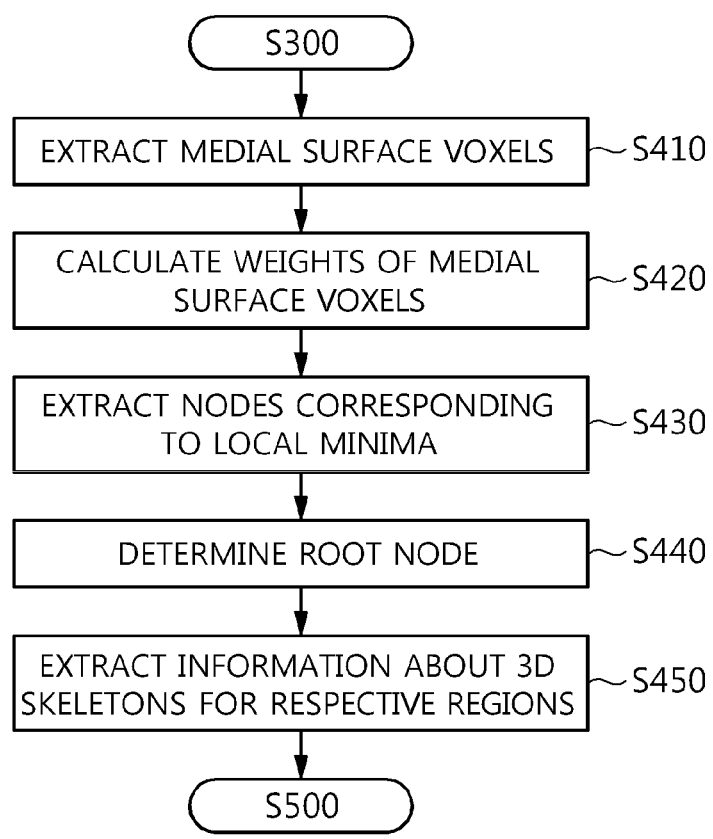

FIG. 14 is a flowchart showing in detail the step S400 of the method of estimating the joint structure according to the present invention shown in FIG. 13.

Referring to FIG. 14, at the step S400 of generating the 3D skeleton information of the human body from the voxel-based 3D shape information of the human body, the medial surface voxel extraction unit extracts medial surface voxels, which are a minimum number of surface voxels enabling the representation of the 3D shape of the human body, from surface voxels in the voxel-based 3D shape information of the human body generated by the human body shape restoration unit at step S410.

Further, the weight calculation unit calculates weights indicative of distances from the center of gravity of the human body to the respective medial surface voxels extracted by the medial surface voxel extraction unit at step S420.

Next, the node estimation unit extracts nodes, which are medial surface voxels corresponding to local minima, based on the weights of the medial surface voxels calculated by the weight calculation unit at step S430.

Further, the root node determination unit determines a root node corresponding to a root joint in the hierarchical skeletal structure of the human body, previously stored in the storage unit, from the nodes extracted by the node estimation unit, at step S440.

Thereafter, the 3D skeletal structure extraction unit obtains the shortest path based on Dijkstra's algorithm by using as a starting point the root node determined by the root node determination unit, and connects nodes along the shortest path, thus extracting information about 3D skeletons for respective regions of the human body at step S450.

As described above, the present invention is advantageous in that it can estimate the positions of joints using only multi-view image information acquired by capturing a human body, unlike conventional technology that estimates the skeletal structure of a human body having assumed any posture by means of a tracking method of utilizing joint position information input from a user or the joint position information of adjacent frames on a time axis, thus obtaining the posture information of the human body having assumed any posture without requiring information input from the user or the posture information of adjacent frames.

Further, the present invention can provide skeletal structure estimation technology that can be applied to the analysis of the action patterns of a human body, human body recognition of security fields, and the field of markerless body motion capture.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for estimating a joint structure of a human body, comprising:
    a multi-view image acquisition unit for receiving multi-view images acquired by capturing a human body;
    a human body foreground separation unit for extracting a foreground region corresponding to the human body from the acquired multi-view images;
    a human body shape restoration unit for restoring voxels indicating geometric space occupation information of the human body using the foreground region corresponding to the human body, thus generating voxel-based three-dimensional (3D) shape information of the human body;
    a skeleton information extraction unit for generating 3D skeleton information from the generated voxel-based 3D shape information of the human body; and
    a skeletal structure estimation unit for estimating positions of respective joints from a skeletal structure of the human body using both the generated 3D skeleton information and anthropometric information,
    wherein the skeleton information extraction unit comprises a medial surface voxel extraction unit for extracting medial surface voxels, which are a minimum number of surface voxels enabling representation of a 3D shape of the human body, from surface voxels in the 3D shape information of the human body.

2. The apparatus of claim 1, wherein the skeleton information extraction unit further comprises a weight calculation unit for calculating weights indicative of distances from a center of gravity of the human body to the respective extracted medial surface voxels.

3. The apparatus of claim 2, wherein the skeleton information extraction unit further comprises a node estimation unit for extracting nodes, which are medial surface voxels corresponding to local minima, from the medial surface voxels based on the weights.

4. The apparatus of claim 3, wherein the skeleton information extraction unit further comprises a root node determination unit for determining a root node corresponding to a root joint in a hierarchical skeletal structure of the human body from the nodes.

5. The apparatus of claim 4, wherein the skeleton information extraction unit further comprises a 3D skeletal structure extraction unit for connecting the nodes along a shortest path based on Dijkstra's algorithm by using the root node as a starting point, and then extracting information about 3D skeletons for respective regions of the human body.

6. The apparatus of claim 5, wherein the multi-view image acquisition unit performs camera geometric calibration on each of the multi-view images, input from multiple cameras that capture the human body, based on a global coordinate system located at a center of gravity of the multiple cameras.

7. The apparatus of claim 6, wherein the human body shape restoration unit projects individual voxels in a voxel space, which is constructed based on information about the camera geometric calibration performed by the multi-view image acquisition unit, on each of the multi-view images, thus generating the voxel-based 3D shape information of the human body.

8. The apparatus of claim 7, further comprising a storage unit for storing the information about the camera geometric calibration, the anthropometric information, and information about the hierarchical skeletal structure of the human body.

9. A method of estimating a joint structure of a human body, comprising:
- receiving multi-view images acquired by capturing a human body;
- extracting a foreground region corresponding to the human body from the acquired multi-view images;
- restoring voxels indicating geometric space occupation information of the human body using the foreground region corresponding to the human body, thus generating voxel-based three-dimensional (3D) shape information of the human body;
- generating 3D skeleton information from the generated voxel-based 3D shape information of the human body; and
- estimating positions of respective joints from a skeletal structure of the human body using both the generated 3D skeleton information and anthropometric information,
- wherein generating the 3D skeleton information comprises extracting medial surface voxels, which are a minimum number of surface voxels enabling representation of a 3D shape of the human body, from surface voxels in the 3D shape information of the human body.

10. The method of claim 9, wherein the generating the 3D skeleton information further comprises calculating weights indicative of distances from a center of gravity of the human body to the respective medial surface voxels.

11. The method of claim 10, wherein the generating the 3D skeleton information further comprises extracting nodes, which are medial surface voxels corresponding to local minima, from the medial surface voxels based on the weights.

12. The method of claim 11, wherein the generating the 3D skeleton information further comprises determining a root node corresponding to a root joint in a hierarchical skeletal structure of the human body from the nodes.

13. The method of claim 12, wherein the generating the 3D skeleton information further comprises connecting the nodes along a shortest path based on Dijkstra's algorithm by using the root node as a starting point, and then extracting information about 3D skeletons for respective regions of the human body.

14. The method of claim 9, wherein the receiving the multi-view images acquired by capturing the human body comprises performing camera geometric calibration on each of the multi-view images, input from multiple cameras that capture the human body, based on a global coordinate system located at a center of gravity of the multiple cameras.

15. The method of claim 14, wherein the voxel-based 3D shape information of the human body is generated by projecting individual voxels in a voxel space, which is constructed based on information about the camera geometric calibration, on each of the multi-view images.

* * * * *